(12) United States Patent
Brunner et al.

(10) Patent No.: US 11,529,985 B2
(45) Date of Patent: Dec. 20, 2022

(54) TROLLEY AND MECHANICAL BRAKING SYSTEM THEREFOR

(71) Applicants: KETER PLASTIC LTD., Herzelyia (IL); MILWAUKEE ELECTRIC TOOL CORPORATION, Brookfield, WI (US)

(72) Inventors: Yaron Brunner, Kibbutz Gvat (IL); Omer Menashri, Kibbutz Afikim (IL); Izhar Shany, Kibutz Gvat (IL); Uri Parizer, Kibbutz Hukok (IL); Grant T. Squiers, Cudahy, WI (US)

(73) Assignees: KETER PLASTIC LTD., Herzliya (IL); MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 15/733,249

(22) PCT Filed: Dec. 20, 2018

(86) PCT No.: PCT/IL2018/051381
§ 371 (c)(1),
(2) Date: Jun. 17, 2020

(87) PCT Pub. No.: WO2019/123465
PCT Pub. Date: Jun. 27, 2019

(65) Prior Publication Data
US 2021/0094600 A1    Apr. 1, 2021

Related U.S. Application Data

(63) Continuation of application No. PCT/US2018/044629, filed on Jul. 31, 2018.
(Continued)

(51) Int. Cl.
*B62B 5/04* (2006.01)
*B62B 3/04* (2006.01)
(Continued)

(52) U.S. Cl.
CPC .............. *B62B 5/0433* (2013.01); *B62B 3/04* (2013.01); *B62B 5/049* (2013.01); *F16D 63/00* (2013.01); *B62B 3/008* (2013.01); *F16D 2125/64* (2013.01)

(58) Field of Classification Search
CPC ......... B62B 5/0433; B62B 3/04; B62B 5/049; B62B 3/008; F16D 63/00; F16D 2125/64
See application file for complete search history.

(56) References Cited

U.S. PATENT DOCUMENTS 495,537 A    4/1893  Westerman
509,839 A    11/1893 Bowley
(Continued)

FOREIGN PATENT DOCUMENTS

CA    2562993 A1 *  4/2007   ................ B60T 1/14
CN    2608238 Y     3/2004
(Continued)

OTHER PUBLICATIONS

AUER Packaging 1 2016 ("Auer-Catalog").
(Continued)

*Primary Examiner* — James A Shriver, II
*Assistant Examiner* — Ian Bryce Shelton
(74) *Attorney, Agent, or Firm* — Vorys, Sater, Seymour and Pease LLP; Anthony P. Venturino; Maryellen Feehery Hank

(57) ABSTRACT

Provided are mechanical braking systems for wheeled trolleys, trolleys including a mechanical braking system and methods for controlling movement thereof.

18 Claims, 7 Drawing Sheets

Related U.S. Application Data

(60) Provisional application No. 62/686,301, filed on Jun. 18, 2018, provisional application No. 62/609,985, filed on Dec. 22, 2017, provisional application No. 62/608,302, filed on Dec. 20, 2017.

(51) Int. Cl.
*F16D 63/00* (2006.01)
*B62B 3/00* (2006.01)
*F16D 125/64* (2012.01)

(56) References Cited

U.S. PATENT DOCUMENTS

| | | |
|---|---|---|
| 1,081,378 A | 12/1913 | Freeman |
| 1,084,360 A | 1/1914 | Rahm |
| 1,112,943 A | 10/1914 | Stone |
| 1,488,460 A | 3/1924 | Scheer |
| 1,704,480 A * | 3/1929 | Kicileski ............. B60T 1/14 188/5 |
| D85,986 S | 1/1932 | Myers |
| 2,042,387 A | 5/1936 | High et al. |
| 2,100,036 A * | 11/1937 | Michal ............. B62B 9/082 188/20 |
| 2,103,106 A | 12/1937 | Yurkovitch |
| 2,124,541 A | 7/1938 | Cassey |
| 2,210,235 A | 8/1940 | Filbert |
| 2,386,343 A | 10/1945 | Regenhardt |
| 2,430,200 A | 11/1947 | Wilson |
| 2,558,126 A | 6/1951 | Davenport |
| 2,588,009 A | 3/1952 | Jones |
| 2,939,613 A | 6/1960 | Herman et al. |
| 2,970,358 A | 2/1961 | Elsner |
| 3,005,282 A | 10/1961 | Christiansen |
| 3,117,692 A | 1/1964 | Carpenter et al. |
| 3,186,585 A | 6/1965 | Denny |
| 3,225,865 A | 12/1965 | Downey |
| 3,423,786 A | 1/1969 | Arias, Jr. et al. |
| 3,424,334 A | 1/1969 | Goltz |
| 3,506,321 A | 4/1970 | Hampel |
| 3,514,170 A | 5/1970 | Shewchuk |
| 3,550,908 A | 12/1970 | Propst et al. |
| 3,552,817 A | 1/1971 | Marcolongo |
| 3,567,298 A | 3/1971 | Ambaum et al. |
| 3,743,372 A | 7/1973 | Ruggerone |
| D232,798 S | 9/1974 | Roche |
| 3,851,936 A | 12/1974 | Muller |
| 3,935,613 A | 2/1976 | Kaneko |
| 3,974,898 A | 8/1976 | Tullis et al. |
| 3,999,818 A | 12/1976 | Schankler |
| 4,043,566 A * | 8/1977 | Johnson ............. A63C 17/01 280/87.042 |
| 4,122,925 A | 10/1978 | Schultheiss |
| 4,168,076 A * | 9/1979 | Johnson ............. A63C 17/01 188/5 |
| 4,243,279 A | 1/1981 | Ackeret |
| 4,491,231 A | 1/1985 | Heggeland et al. |
| 4,524,985 A | 6/1985 | Drake |
| 4,564,732 A | 1/1986 | Lancaster et al. |
| 4,577,772 A | 3/1986 | Bigliardi |
| D285,986 S | 10/1986 | Huang |
| 4,639,005 A | 1/1987 | Birkley |
| 4,643,494 A | 2/1987 | Marleau |
| 4,660,725 A | 4/1987 | Fishman et al. |
| 4,673,070 A | 6/1987 | Ambal |
| 4,684,034 A | 8/1987 | Ono et al. |
| 4,693,345 A | 9/1987 | Mittelmann |
| 4,735,107 A | 4/1988 | Winkie |
| 4,805,859 A | 2/1989 | Hudson |
| 4,817,237 A | 4/1989 | Murphy |
| 4,929,973 A | 5/1990 | Nakatani |
| 4,971,201 A | 11/1990 | Sathre |
| 5,035,389 A | 7/1991 | Wang |
| 5,035,445 A * | 7/1991 | Poulin ............. B62B 5/049 280/763.1 |
| D319,016 S | 8/1991 | Kahl |
| 5,098,235 A | 3/1992 | Svetlik |
| D325,324 S | 4/1992 | Kahl |
| 5,105,947 A | 4/1992 | Wise |
| D326,815 S | 6/1992 | Meisner et al. |
| 5,154,291 A | 10/1992 | Sur |
| 5,240,264 A | 8/1993 | Williams |
| D340,167 S | 10/1993 | Kahl |
| 5,282,554 A | 2/1994 | Thomas |
| 5,301,829 A | 4/1994 | Chrisco |
| 5,325,966 A | 7/1994 | Chang |
| 5,356,038 A | 10/1994 | Banks |
| 5,356,105 A | 10/1994 | Andrews |
| D352,208 S | 11/1994 | Brookshire |
| 5,375,709 A | 12/1994 | Petro |
| 5,429,235 A | 7/1995 | Chen |
| 5,429,260 A | 7/1995 | Vollers |
| 5,433,416 A | 7/1995 | Johnson |
| D361,511 S | 8/1995 | Dickinson et al. |
| 5,454,634 A | 10/1995 | Herbst et al. |
| 5,538,213 A | 7/1996 | Brown |
| 5,595,228 A | 1/1997 | Meisner et al. |
| 5,608,603 A | 3/1997 | Su |
| 5,622,296 A | 4/1997 | Pirhonen et al. |
| 5,628,443 A | 5/1997 | Deutsch |
| 5,653,366 A | 8/1997 | Liserre |
| 5,664,292 A | 9/1997 | Chen |
| D395,533 S | 6/1998 | Morison et al. |
| 5,775,046 A | 7/1998 | Fanger et al. |
| 5,797,617 A | 8/1998 | Lin |
| 5,850,996 A | 12/1998 | Liang |
| 5,890,613 A | 4/1999 | Williams |
| 5,951,037 A | 9/1999 | Hsieh et al. |
| 5,957,421 A | 9/1999 | Barbour |
| D415,393 S | 10/1999 | Kei |
| 5,988,473 A | 11/1999 | Hagan et al. |
| D420,860 S | 2/2000 | Golichowski et al. |
| 6,036,071 A | 3/2000 | Hartmann et al. |
| 6,050,660 A | 4/2000 | Gurley |
| 6,082,539 A | 7/2000 | Lee |
| 6,082,687 A | 7/2000 | Kump et al. |
| 6,085,925 A | 7/2000 | Chung |
| 6,098,858 A | 8/2000 | Laugesen |
| 6,109,627 A | 8/2000 | Be |
| 6,123,344 A | 9/2000 | Clegg |
| 6,131,926 A | 10/2000 | Harlan |
| 6,132,819 A | 10/2000 | Ober et al. |
| 6,176,558 B1 | 1/2001 | Hlade et al. |
| 6,176,559 B1 | 1/2001 | Tiramani et al. |
| D437,484 S | 2/2001 | Tiramani et al. |
| D437,669 S | 2/2001 | Blason et al. |
| 6,305,498 B1 | 10/2001 | Itzkovitch |
| 6,347,847 B1 | 2/2002 | Tiramani et al. |
| 6,354,759 B1 | 3/2002 | Leicht |
| 6,367,631 B1 | 4/2002 | Steigerwald |
| 6,371,320 B2 | 4/2002 | Sagol |
| 6,371,321 B1 | 4/2002 | Lee |
| 6,371,424 B1 | 4/2002 | Shaw |
| D456,972 S | 5/2002 | Blason et al. |
| 6,431,580 B1 | 8/2002 | Kady |
| 6,497,395 B1 | 12/2002 | Croker |
| 6,547,347 B2 | 4/2003 | Saito et al. |
| 6,601,930 B2 | 8/2003 | Tiramani et al. |
| 6,619,772 B2 | 9/2003 | Dierbeck |
| 6,637,707 B1 | 10/2003 | Gates et al. |
| 6,641,013 B2 | 11/2003 | Dise |
| 6,889,838 B2 | 5/2005 | Meier et al. |
| 6,894,160 B2 | 5/2005 | Capan |
| 6,945,546 B2 | 9/2005 | Guirlinger |
| 6,948,691 B2 | 9/2005 | Brock et al. |
| 6,983,946 B2 | 1/2006 | Sullivan et al. |
| 7,007,903 B2 | 3/2006 | Turner |
| 7,044,484 B2 | 5/2006 | Wang |
| 7,066,475 B2 | 6/2006 | Barnes |
| 7,077,372 B2 | 7/2006 | Moran |
| D525,789 S | 8/2006 | Hosking |
| D527,225 S | 8/2006 | Krieger et al. |
| 7,083,061 B2 | 8/2006 | Spindel et al. |
| 7,090,085 B1 | 8/2006 | Vicendese et al. |

(56) References Cited

U.S. PATENT DOCUMENTS

| | | |
|---|---|---|
| 7,121,417 B2 | 10/2006 | Magnusson et al. |
| 7,147,243 B2 | 12/2006 | Kady |
| 7,152,752 B2 | 12/2006 | Kurtenbach |
| D536,580 S | 2/2007 | Krieger et al. |
| 7,172,164 B2 | 2/2007 | Fuelling et al. |
| 7,219,969 B2 | 5/2007 | Bezzubov |
| D545,697 S | 7/2007 | Martin |
| 7,263,742 B2 | 9/2007 | Valentini |
| 7,350,648 B2 | 4/2008 | Gerstner et al. |
| 7,367,571 B1 | 5/2008 | Nichols |
| 7,431,172 B1 | 10/2008 | Spindel et al. |
| 7,448,115 B2 | 11/2008 | Howell et al. |
| 7,490,800 B2 | 2/2009 | Tu |
| 7,503,569 B2 | 3/2009 | Duvigneau |
| 7,658,887 B2 | 2/2010 | Hovatter |
| 7,690,856 B2 | 4/2010 | Mortensen |
| 7,757,913 B2 | 7/2010 | Fichera |
| 7,779,764 B2 | 8/2010 | Naidu et al. |
| 7,780,026 B1 | 8/2010 | Zuckerman |
| D627,967 S | 11/2010 | Kuhls |
| 7,837,165 B2 | 11/2010 | Stone |
| 7,841,144 B2 | 11/2010 | Pervan |
| D630,851 S | 1/2011 | Landau et al. |
| 8,028,845 B2 | 10/2011 | Himes |
| D649,350 S | 11/2011 | Shitrit |
| D649,783 S | 12/2011 | Brunner |
| D653,832 S | 2/2012 | Vilkomirski et al. |
| 8,132,819 B2 | 3/2012 | Landau et al. |
| 8,177,463 B2 | 5/2012 | Walker |
| D661,858 S | 6/2012 | Lifshitz et al. |
| 8,191,910 B2 | 6/2012 | Landau et al. |
| D663,952 S | 7/2012 | Crevling, Jr. et al. |
| D664,354 S | 7/2012 | Crevling, Jr. et al. |
| D668,869 S | 10/2012 | Yamamoto et al. |
| 8,292,244 B2 | 10/2012 | Okada |
| D674,605 S | 1/2013 | Vilkomirski et al. |
| 8,448,829 B2 | 5/2013 | Watanabe |
| 8,454,033 B2 | 6/2013 | Tsai |
| 8,459,495 B2 | 6/2013 | Koenig et al. |
| 8,505,729 B2 | 8/2013 | Sosnovsky et al. |
| 8,567,796 B2 | 10/2013 | Bar-Erez et al. |
| 8,602,217 B2 | 12/2013 | Sosnovsky et al. |
| 8,640,913 B2 | 2/2014 | Berendes |
| 8,677,661 B2 | 3/2014 | Michels et al. |
| D701,696 S | 4/2014 | Shitrit et al. |
| 8,689,396 B2 | 4/2014 | Wolfe et al. |
| 8,714,355 B2 | 5/2014 | Huang |
| 8,813,960 B2 | 8/2014 | Fjelland |
| 8,851,282 B2 | 10/2014 | Brunner |
| 8,875,888 B2 | 11/2014 | Koenig et al. |
| 8,924,752 B1 | 12/2014 | Law et al. |
| 8,925,752 B2 | 1/2015 | Smith |
| 8,979,100 B2 | 3/2015 | Bensman et al. |
| 8,985,922 B2 | 3/2015 | Neumann |
| D738,105 S | 9/2015 | Shitrit |
| D738,106 S | 9/2015 | Shitrit |
| D738,622 S | 9/2015 | Sabbag et al. |
| 9,132,543 B2 | 9/2015 | Bar-Erez et al. |
| D753,394 S | 4/2016 | Brunner |
| D753,395 S | 4/2016 | Brunner |
| D753,396 S | 4/2016 | Brunner |
| D753,982 S | 4/2016 | Guirlinger |
| D765,974 S | 9/2016 | Tonelli et al. |
| D770,179 S | 11/2016 | Menirom |
| 9,506,489 B2 | 11/2016 | Ko |
| 9,511,491 B2 | 12/2016 | Brunner |
| D777,426 S | 1/2017 | Dahl |
| 9,551,367 B1 | 1/2017 | Shieh |
| 9,566,990 B2 | 2/2017 | Bar-Erez et al. |
| D784,089 S | 4/2017 | Furneaux et al. |
| 9,616,562 B2 | 4/2017 | Hoppe et al. |
| 9,643,629 B2 | 5/2017 | Bar-Erez et al. |
| D790,221 S | 6/2017 | Yahav et al. |
| 9,701,443 B2 | 7/2017 | Wang |
| 9,725,209 B1 | 8/2017 | Ben-Gigi |
| D803,631 S | 11/2017 | Min et al. |
| 9,850,029 B2 | 12/2017 | Brunner |
| D806,483 S | 1/2018 | Stanford et al. |
| 9,872,562 B2 | 1/2018 | Brunner |
| 9,888,752 B2 | 2/2018 | Den Boer et al. |
| D814,187 S | 4/2018 | Caglar |
| D815,831 S | 4/2018 | Tonelli |
| D816,334 S | 5/2018 | Brunner |
| 10,017,134 B2 | 7/2018 | Pickens et al. |
| D826,510 S | 8/2018 | Brunner |
| RE47,022 E | 9/2018 | Sosnovsky et al. |
| D828,671 S | 9/2018 | Cope et al. |
| D831,352 S | 10/2018 | Brunner |
| 10,106,180 B2 | 10/2018 | Bar-Erez et al. |
| D833,744 S | 11/2018 | Yahav et al. |
| D836,995 S | 1/2019 | Carey et al. |
| D837,515 S | 1/2019 | Shpitzer |
| D839,681 S | 2/2019 | Evron et al. |
| 10,222,172 B2 | 3/2019 | Melville |
| D845,080 S | 4/2019 | Jacobsen et al. |
| D845,081 S | 4/2019 | Jacobsen |
| 10,336,359 B1 * | 7/2019 | Asbille ............... B62B 3/008 |
| D857,387 S | 8/2019 | Shpitzer |
| 10,406,387 B2 | 9/2019 | Krepel et al. |
| 10,434,638 B1 | 10/2019 | Tsai |
| D871,013 S | 12/2019 | Liu |
| D873,085 S | 1/2020 | Defrancia |
| D876,833 S | 3/2020 | Brunner et al. |
| 10,583,962 B2 | 3/2020 | Brunner |
| 10,593,962 B2 | 3/2020 | Herchen et al. |
| 10,603,783 B2 | 3/2020 | Brocket et al. |
| D880,252 S | 4/2020 | Jacobsen |
| D880,951 S | 4/2020 | Jacobsen |
| D883,752 S | 5/2020 | Carey et al. |
| D887,788 S | 6/2020 | Meda et al. |
| D888,422 S | 6/2020 | Yang |
| D888,503 S | 6/2020 | Meda et al. |
| D891,193 S | 7/2020 | Stanford et al. |
| D891,195 S | 7/2020 | Zhou |
| 10,703,534 B2 | 7/2020 | Brunner et al. |
| D891,875 S | 8/2020 | Olson |
| D892,565 S | 8/2020 | Astle et al. |
| D895,375 S | 8/2020 | Astle et al. |
| 10,750,833 B2 | 8/2020 | Burchia |
| D895,966 S | 9/2020 | Brunner |
| D895,967 S | 9/2020 | Brunner |
| D896,517 S | 9/2020 | Brunner et al. |
| D896,518 S | 9/2020 | Brunner et al. |
| D897,103 S | 9/2020 | Brunner |
| 10,758,065 B2 | 9/2020 | Penalver, Jr. |
| D898,320 S | 10/2020 | Brunner et al. |
| 10,793,172 B2 | 10/2020 | Brunner |
| 10,829,268 B2 | 11/2020 | Sommer |
| 10,829,269 B2 | 11/2020 | Gonitianer et al. |
| 10,894,314 B2 | 1/2021 | Hocine et al. |
| 10,933,501 B2 | 3/2021 | Bisson |
| 10,962,218 B2 | 3/2021 | Plato |
| 10,981,696 B2 | 4/2021 | Brunner et al. |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| D920,671 S | 6/2021 | Brunner et al. |
| D923,935 S | 7/2021 | Brunner et al. |
| 11,059,631 B1 | 7/2021 | Brunner et al. |
| 11,066,089 B2 | 7/2021 | Brunner |
| D932,186 S | 10/2021 | Brunner et al. |
| 11,155,382 B1 | 10/2021 | Cai |
| D936,030 S | 11/2021 | Lee et al. |
| D941,020 S | 1/2022 | Brunner et al. |
| 11,230,410 B2 | 1/2022 | Brunner |
| 11,283,117 B2 | 3/2022 | Polakowski et al. |
| 2002/0000440 A1 | 1/2002 | Sagol |
| 2002/0030425 A1 | 3/2002 | Tiramani et al. |
| 2002/0125072 A1 | 9/2002 | Levy |
| 2002/0171228 A1 | 11/2002 | Kady |
| 2003/0075468 A1 | 4/2003 | Story et al. |
| 2003/0094392 A1 | 5/2003 | Meier et al. |
| 2003/0094393 A1 | 5/2003 | Sahm |

(56) References Cited

U.S. PATENT DOCUMENTS

| | | |
|---|---|---|
| 2003/0115715 A1 | 6/2003 | Valentini |
| 2003/0146589 A1 | 8/2003 | Jarko et al. |
| 2003/0184034 A1 | 10/2003 | Pfeiffer |
| 2003/0205877 A1 | 11/2003 | Verna et al. |
| 2004/0074725 A1 | 4/2004 | Shih |
| 2004/0103494 A1 | 6/2004 | Valentini |
| 2004/0149754 A1 | 8/2004 | Diamant |
| 2004/0195793 A1 | 10/2004 | Sullivan et al. |
| 2004/0206656 A1 | 10/2004 | Dubois et al. |
| 2004/0256529 A1 | 12/2004 | Richter |
| 2005/0015928 A1 | 1/2005 | Arsenault et al. |
| 2005/0062244 A1 | 3/2005 | Guirlinger |
| 2005/0082775 A1 | 4/2005 | Slager |
| 2005/0104308 A1 | 5/2005 | Barnes |
| 2005/0139745 A1 | 6/2005 | Liao et al. |
| 2005/0242144 A1 | 11/2005 | Panosian et al. |
| 2006/0006770 A1 | 1/2006 | Valentini |
| 2006/0027475 A1 | 2/2006 | Gleason et al. |
| 2006/0038367 A9 | 2/2006 | Ferraro et al. |
| 2006/0076261 A1 | 4/2006 | Kurtenbach |
| 2006/0113303 A1 | 6/2006 | Huruta |
| 2006/0119060 A1 | 6/2006 | Sullivan et al. |
| 2006/0165482 A1 | 7/2006 | Olberding |
| 2006/0186624 A1 | 8/2006 | Kady |
| 2006/0254946 A1 | 11/2006 | Becklin |
| 2007/0006542 A1 | 1/2007 | Duke |
| 2007/0012694 A1 | 1/2007 | Duvigneau |
| 2007/0045505 A1 | 3/2007 | Chen |
| 2007/0068757 A1 | 3/2007 | Tan |
| 2007/0090616 A1 | 4/2007 | Tompkins |
| 2007/0145700 A1 | 6/2007 | Ambrose et al. |
| 2007/0194543 A1 | 8/2007 | Duvigneau |
| 2007/0273114 A1 | 11/2007 | Katz |
| 2008/0060953 A1 | 3/2008 | Ghassan |
| 2008/0104921 A1 | 5/2008 | Pervan et al. |
| 2008/0115312 A1 | 5/2008 | DiPasquale et al. |
| 2008/0121547 A1 | 5/2008 | Dur et al. |
| 2008/0134607 A1 | 6/2008 | Pervan et al. |
| 2008/0136133 A1* | 6/2008 | Takahashi ............ A45C 5/145 280/79.2 |
| 2008/0169739 A1 | 7/2008 | Goldenberg |
| 2008/0271280 A1 | 11/2008 | Tiede et al. |
| 2008/0277221 A1 | 11/2008 | Josefson et al. |
| 2008/0280523 A1 | 11/2008 | Bishop |
| 2008/0296443 A1 | 12/2008 | Lunitz et al. |
| 2008/0308369 A1 | 12/2008 | Louis, Sr. |
| 2009/0026901 A1 | 1/2009 | Nies, III et al. |
| 2009/0071990 A1 | 3/2009 | Jardine et al. |
| 2009/0127146 A1 | 5/2009 | Krebs et al. |
| 2009/0145790 A1 | 6/2009 | Panosian et al. |
| 2009/0145866 A1 | 6/2009 | Panosian et al. |
| 2009/0145913 A1 | 6/2009 | Panosian et al. |
| 2009/0178946 A1 | 7/2009 | Patsone et al. |
| 2009/0236482 A1 | 9/2009 | Winig et al. |
| 2009/0288970 A1 | 11/2009 | Katz et al. |
| 2010/0052276 A1 | 3/2010 | Brunner |
| 2010/0139566 A1 | 6/2010 | Lopuszanski |
| 2010/0147642 A1 | 6/2010 | Andochick |
| 2010/0176261 A1 | 7/2010 | Chen et al. |
| 2010/0219193 A1 | 9/2010 | Becklin |
| 2010/0224528 A1 | 9/2010 | Madsen |
| 2010/0290877 A1 | 11/2010 | Landau et al. |
| 2011/0049824 A1 | 3/2011 | Bar-Erez et al. |
| 2011/0073516 A1 | 3/2011 | Zelinskiy |
| 2011/0139665 A1 | 6/2011 | Madsen |
| 2011/0139777 A1 | 6/2011 | Sosnovsky et al. |
| 2011/0155613 A1 | 6/2011 | Koenig et al. |
| 2011/0174939 A1 | 7/2011 | Taylor |
| 2011/0181008 A1 | 7/2011 | Bensman et al. |
| 2011/0220531 A1 | 9/2011 | Meether et al. |
| 2012/0073995 A1 | 3/2012 | Parker |
| 2012/0074022 A1 | 3/2012 | Mctavish |
| 2012/0074158 A1 | 3/2012 | Lafleur |
| 2012/0080432 A1 | 4/2012 | Bensman et al. |
| 2012/0152800 A1 | 6/2012 | Parzy et al. |
| 2012/0152944 A1 | 6/2012 | Vilkomirski et al. |
| 2012/0160886 A1 | 6/2012 | Henny et al. |
| 2012/0180250 A1 | 7/2012 | Ricklefsen et al. |
| 2012/0207571 A1 | 8/2012 | Scott |
| 2012/0292213 A1 | 11/2012 | Brunner |
| 2012/0326406 A1 | 12/2012 | Lifshitz et al. |
| 2013/0024468 A1 | 1/2013 | Kocsis |
| 2013/0031731 A1 | 2/2013 | Hess |
| 2013/0031732 A1 | 2/2013 | Hess et al. |
| 2013/0068903 A1 | 3/2013 | O'Keene |
| 2013/0121783 A1 | 5/2013 | Kelly |
| 2013/0127129 A1 | 5/2013 | Bensman et al. |
| 2013/0146551 A1 | 6/2013 | Simpson et al. |
| 2013/0154218 A1 | 6/2013 | Tiilikaninen |
| 2013/0206139 A1 | 8/2013 | Krepel et al. |
| 2013/0223971 A1 | 8/2013 | Grace, IV |
| 2014/0062042 A1 | 3/2014 | Wagner et al. |
| 2014/0069832 A1 | 3/2014 | Roehm |
| 2014/0076759 A1 | 3/2014 | Roehm et al. |
| 2014/0123478 A1 | 5/2014 | Gylander et al. |
| 2014/0161518 A1 | 6/2014 | Ko |
| 2014/0166516 A1 | 6/2014 | Martinez et al. |
| 2014/0197059 A1 | 7/2014 | Evans et al. |
| 2015/0014949 A1 | 1/2015 | Dittman |
| 2015/0034515 A1 | 2/2015 | Monyak et al. |
| 2015/0151427 A1 | 6/2015 | Ben-Gigi |
| 2015/0274362 A1 | 10/2015 | Christopher et al. |
| 2015/0310842 A1 | 10/2015 | Coburn et al. |
| 2015/0376917 A1 | 12/2015 | Brunner |
| 2016/0023349 A1 | 1/2016 | Hoppe et al. |
| 2016/0130034 A1 | 5/2016 | Kuhls et al. |
| 2016/0144500 A1 | 5/2016 | Chen |
| 2016/0168880 A1 | 6/2016 | Phelan |
| 2016/0213115 A1 | 7/2016 | Gonitianer et al. |
| 2016/0221177 A1 | 8/2016 | Reinhart |
| 2017/0065355 A1* | 3/2017 | Ross .................... A61B 50/13 |
| 2017/0098513 A1 | 4/2017 | Horváth et al. |
| 2017/0121056 A1 | 5/2017 | Wang |
| 2017/0138382 A1 | 5/2017 | Ko |
| 2017/0158216 A1 | 6/2017 | Yahav et al. |
| 2017/0165828 A1 | 6/2017 | Fleischmann |
| 2017/0166352 A1 | 6/2017 | Hoppe et al. |
| 2017/0174392 A1 | 6/2017 | De Loynes |
| 2017/0217464 A1 | 8/2017 | Bar-Erez et al. |
| 2017/0239808 A1 | 8/2017 | Hoppe et al. |
| 2017/0257958 A1 | 9/2017 | Sabbag et al. |
| 2017/0266804 A1 | 9/2017 | Kinskey |
| 2017/0318927 A1 | 11/2017 | Kraus et al. |
| 2017/0349013 A1 | 12/2017 | Gronholm |
| 2018/0000234 A1 | 1/2018 | White |
| 2018/0044059 A1 | 2/2018 | Brunner |
| 2018/0099405 A1 | 4/2018 | Reinhart |
| 2018/0127007 A1 | 5/2018 | Kravchenko |
| 2018/0153312 A1 | 6/2018 | Buck et al. |
| 2018/0161975 A1 | 6/2018 | Brunner |
| 2018/0186513 A1 | 7/2018 | Brunner |
| 2018/0213934 A1 | 8/2018 | Wolle et al. |
| 2018/0220758 A1 | 8/2018 | Burchia |
| 2018/0229889 A1 | 8/2018 | Li |
| 2018/0290288 A1 | 10/2018 | Brunner |
| 2019/0001482 A1 | 1/2019 | Wolle et al. |
| 2019/0002004 A1 | 1/2019 | Brunner |
| 2019/0031222 A1 | 1/2019 | Takyar et al. |
| 2019/0039781 A1 | 2/2019 | Kogel et al. |
| 2019/0106244 A1 | 4/2019 | Brunner et al. |
| 2019/0168376 A1 | 6/2019 | Brocket et al. |
| 2019/0225371 A1 | 7/2019 | Hoppe et al. |
| 2019/0225374 A1 | 7/2019 | Mccrea et al. |
| 2020/0029543 A1 | 1/2020 | Householder |
| 2020/0055534 A1 | 2/2020 | Hassell |
| 2020/0078929 A1 | 3/2020 | Liu |
| 2020/0147781 A1 | 5/2020 | Squiers |
| 2020/0165036 A1 | 5/2020 | Squiers |
| 2020/0223585 A1 | 7/2020 | Brunner et al. |
| 2020/0243925 A1 | 7/2020 | Polakowski et al. |
| 2020/0299027 A1 | 9/2020 | Brunner et al. |
| 2020/0346819 A1 | 11/2020 | Kogel |
| 2021/0025706 A1 | 1/2021 | Millane |
| 2021/0031975 A1 | 2/2021 | Brunner |

(56) References Cited

U.S. PATENT DOCUMENTS

| | | | |
|---|---|---|---|
| 2021/0039831 A1 | 2/2021 | Brunner | |
| 2021/0094600 A1 | 4/2021 | Brunner et al. | |
| 2021/0104909 A1 | 4/2021 | Mantych | |
| 2021/0155373 A1 | 5/2021 | Cai | |
| 2021/0187725 A1 | 6/2021 | Brunner | |
| 2021/0221561 A1 | 7/2021 | Davidian et al. | |
| 2021/0267368 A1 | 9/2021 | Bruins | |
| 2021/0316909 A1 | 10/2021 | Vargo et al. | |

FOREIGN PATENT DOCUMENTS

| | | | |
|---|---|---|---|
| CN | 2782508 Y | 5/2006 | |
| CN | 200947356 Y | 9/2007 | |
| CN | 101068661 A | 11/2007 | |
| CN | 101362464 A | 2/2009 | |
| CN | 101821148 A | 9/2010 | |
| CN | 102042354 A | 5/2011 | |
| CN | 102137795 A | 7/2011 | |
| CN | 102186714 A | 9/2011 | |
| CN | 102248523 A | 11/2011 | |
| CN | 102469899 A | 5/2012 | |
| CN | 102608238 A | 7/2012 | |
| CN | 102834035 A | 12/2012 | |
| CN | 302371147 S | 3/2013 | |
| CN | 103118578 A | 5/2013 | |
| CN | 103659777 A | 3/2014 | |
| CN | 204161752 U | 2/2015 | |
| DE | 3510307 A1 | 9/1986 | |
| DE | 9313802 U1 | 12/1993 | |
| DE | 4415638 A1 | 11/1995 | |
| DE | 29708343 U1 | 7/1997 | |
| DE | 19750543 A1 | 5/1999 | |
| DE | 20218996 U1 | 3/2003 | |
| DE | 102004057870 A1 | 6/2006 | |
| DE | 202011002617 U1 | 4/2011 | |
| DE | 102010003754 A1 | 10/2011 | |
| DE | 102010003756 A1 | 10/2011 | |
| DE | 102012106482 A1 | 1/2014 | |
| DE | 102012220837 A1 | 5/2014 | |
| DE | 202014103695 U1 | 12/2014 | |
| DE | 202015105053 U1 | 10/2016 | |
| DE | 202015005752 U1 | 11/2016 | |
| DE | 102015112204 A1 | 2/2017 | |
| DE | 102015013053 A1 | 4/2017 | |
| DE | 402018201520 | 11/2018 | |
| EM | 000705231-0001 | 4/2007 | |
| EM | 002419283-0001 | 3/2014 | |
| EP | 0916302 A2 | 5/1999 | |
| EP | 1321247 A2 | 6/2003 | |
| EP | 1428764 B1 | 6/2006 | |
| EP | 1819487 A1 | 8/2007 | |
| EP | 1925406 A1 | 5/2008 | |
| EP | 2289671 A2 | 3/2011 | |
| EP | 2346741 A1 | 7/2011 | |
| EP | 2456341 A1 | 5/2012 | |
| EP | 2 543 297 A2 | 1/2013 | |
| EP | 2555660 A2 | 2/2013 | |
| EP | 2555661 A1 | 2/2013 | |
| EP | 2805799 A2 | 11/2014 | |
| EP | 3141354 A1 | 3/2017 | |
| FR | 3043970 A1 * | 5/2017 | ............ B62B 5/049 |
| GB | 694707 A | 7/1953 | |
| GB | 2047181 B | 2/1983 | |
| GB | 2110076 A | 6/1983 | |
| GB | 2330521 A | 4/1999 | |
| GB | 2406331 A | 3/2005 | |
| GB | 2413265 A | 10/2005 | |
| GB | 2449934 A | 12/2008 | |
| JP | 2003194020 A | 7/2003 | |
| JP | D1180963 S | 8/2003 | |
| JP | 1276744 S | 7/2006 | |
| JP | D1395115 S | 8/2010 | |
| JP | D1395116 S | 8/2010 | |
| JP | D1455321 S | 11/2012 | |
| JP | 2013022972 A | 2/2013 | |
| JP | 2013022976 A | 2/2013 | |
| JP | 1477050 S | 8/2013 | |
| JP | 2014-117961 A | 6/2014 | |
| JP | D1503434 S | 7/2014 | |
| JP | D1625407 S | 2/2019 | |
| JP | D1665028 S | 8/2020 | |
| KR | 300271616 | 2/2000 | |
| KR | 300320243 | 6/2002 | |
| KR | 300806604 | 7/2015 | |
| KR | 300842236 | 3/2016 | |
| KR | 300849600 | 4/2016 | |
| KR | 300859965 | 6/2016 | |
| KR | 3008881296 | 11/2016 | |
| KR | 300999599 | 3/2019 | |
| TW | I324578 B | 5/2010 | |
| TW | D135074 S | 6/2010 | |
| TW | D168686 S | 7/2015 | |
| TW | D174412 S1 | 3/2016 | |
| TW | D192092 | 8/2018 | |
| TW | D206875 | 9/2020 | |
| WO | 2005045886 A2 | 5/2005 | |
| WO | 2006099638 A1 | 9/2006 | |
| WO | 2007121745 A1 | 11/2007 | |
| WO | 2007121746 A2 | 11/2007 | |
| WO | 2008/090546 A1 | 7/2008 | |
| WO | 2009140965 A1 | 11/2009 | |
| WO | 2011/000387 A1 | 1/2011 | |
| WO | 2011009480 A1 | 1/2011 | |
| WO | 2011/032568 A1 | 3/2011 | |
| WO | 2013026084 A1 | 2/2013 | |
| WO | 2014125488 A2 | 8/2014 | |
| WO | 2016142935 A1 | 9/2016 | |
| WO | WO-2016187652 A1 * | 12/2016 | ............ B62B 3/004 |
| WO | 2017028845 A1 | 2/2017 | |
| WO | 2017098513 A1 | 6/2017 | |
| WO | 2017191628 A1 | 11/2017 | |
| WO | 2017212840 A1 | 12/2017 | |
| WO | 2018/213560 A1 | 11/2018 | |
| WO | 2019/028041 A1 | 2/2019 | |

OTHER PUBLICATIONS

AUER Packaging 2 2016.
Amazon. Hopkins FloTool 91002 Thino Box with Mount, https://www.amazon.com/exec/obidos/ASIN/B003K15F31/20140000-20, accessed Jun. 17, 2019.
Batavia Gmbh. BluCave Storage System. https://protect-us.mimecast.com/s/5XIGCR6KypcgJnlKi9EDoim?domain=batavia.eu, accessed Jun. 17, 2019.
Batavia. BluCave Universal Storage System, https://batavia.eu/blucave-storage-system/, accessed Jun. 17, 2019.
BluCave Video?. https://www.youtube.com/watch?v=Sw7fQQPw0tY&feature=youtu.be&t=32.
Cain, Tristan. "Bird Balder, er—Builder." Brick Journal, Nov. 2013 (Issue 26), pp. 15-16.
"Cavity". Merriam-Webster's Collegiate Dictionary (11th Ed.), Merriam-Webster, Incorporated, 2020, p. 197.
Certified Translations of the Cover Pages of DE102015112204A1 and DE202015105053U1.
Final Rejection dated Nov. 28, 2018 in U.S. Appl. No. 15/826,201 (17 Pages).
Forum Post: Systainer clone (dated Feb. 15, 2016).
General Design Principles for DuPont Engineering Polymers, E.I. du Pom de Nemours and Company, 2000.
Get Tools Direct. TSTAC Vac Rack (Suits DWV902M & DWV900L) DwV9500-XJ, https://www.gettoolsdirect.com.au/dewalt-tstak-vac-rack-suits-dwv902m-and-dwv9001-dwv9500-xj.html, accessed Jun. 17, 2019.
International Search Report and Written Opinion for International Application No. PCT/US2018/044629, dated Jan. 9, 2019.
International Search Report and Written Opinion for International Application No. PCT/US2018/033161, dated Aug. 6, 2018 (14 pages).
ITS. Dewalt 171229 Dewait TSTAK Carrier Trolley, https://www.its.co.uk/pd/171229-Dewalt-TSTAK-Carrier-Trolley-_DEW171229.htm, accessed Jun. 17, 2019.

(56) References Cited

OTHER PUBLICATIONS

Kazmer, David. "Design of Plastic Parts." Applied Plastics Engineering Handbook Processing and Materials, edited by Myer Kutz, Elsevier Inc., 2011, pp. 535-551.
Milwaukee Dolly, announced 2019 (online), (site visited Mar. 9, 2020). Available from internet, URL: https://www.zoro.com/milwaukee-tool-box-dolly-7-4164-h-18-2932-w-48-22-8410/i/G3958724/ (Year: 2019).
Messetermine 2016 (dated Feb. 18, 2016), Wayback machine archive (dated Apr. 4, 2016), AUER Packaging 1111 In-and Ausland present (dated Feb. 2016), and photograph, with certified translations.
Neue Produktfamilie: Systemboxen Durchdacht, Komfortabel Und in Wertigem Design (dated Oct. 19, 2015), Wayback machine archive (dated Dec. 16, 2015), AUER Packaging prSsentiert neue Produktfamilie Systernboxen (dated Sep. 2015), and images ("Auer-Press"), with certified translations.
Nugent, Paul. "Rotational Molding," Applied Plastics Engineering Handbook Processing and Materials, edited by Myer Kutz, Elsevier Inc., 2011, pp. 311-332.
Sortimo Logistbm Sortimo International GmbH, Mobile Sortimente, http://p125638.mittwaldserver.info/fileadmin/media/PDFs/Logistixx_Broschuere_DE_WEB.pdf, accessed Jun. 17, 2019.
'Structure Design', Design Solutions Guide, BASF Corporation. 2007.
The Greenhead. Blitz Box—Portable Storage Box/Shelf, https://www.thegreenhead.com/2013/03/blitz-box-portable-storage-box-shelf.php, accessed Jun. 17, 2019.
ToolGuyd. RYOBI ToolBlox Tool Cabinet System, https://toolguyd.com/ryobi-toolblox-cabinets/, accessed Jun. 17, 2019.
Vertak. https://www.alibaba.com/product-detail/Vertak-global-patented-multi-funciton-portable_60217794260.html.
Wheel board, announced 2019 (online), (site visited Mar. 9, 2020). Available from internet, URL: https://www.gearooz.com accu-case-aca-wheel-board (Year: 2019).
Youtube. TSTAK Phase 2 Upgrades Video. https://www.youtube.com/watch?v=jb06y6J1dr4&feature=youtu.be&t=197, accessed Jun. 17, 2019.
Inter Partes Review No. 2021-00373, "Petition for Inter Partes Review of U.S. Pat. No. 10,583,962" Filed Jan. 5, 2021, 198 pages.
Exhibit 1001 in Petition for Inter Partes Review of U.S. Pat. No. 10,583,962, filed Jan. 5, 2021, 64 Pages.
Exhibit 1002 in Petition for Inter Partes Review of U.S. Pat. No. 10,583,962, filed Jan. 5, 2021, 75 Pages.
Exhibit 1003 in Petition for Inter Partes Review of U.S. Pat. No. 10,583,962, filed Jan. 5, 2021, 13 Pages.
Exhibit 1004 in Petition for Inter Partes Review of U.S. Pat. No. 10,583,962, filed Jan. 5, 2021, 18 Pages.
Exhibit 1005 in Petition for Inter Partes Review of U.S. Pat. No. 10,583,962, filed Jan. 5, 2021, 9 Pages.
Exhibit 1006 in Petition for Inter Partes Review of U.S. Pat. No. 10,583,962, filed Jan. 5, 2021, 176 Pages.
Exhibit 1007 in Petition for Inter Partes Review of U.S. Pat. No. 10,583,962, filed Jan. 5, 2021, 22 Pages.
Exhibit 1008 in Petition for Inter Partes Review of U.S. Pat. No. 10,583,962, filed Jan. 5, 2021, 6 Pages.
Exhibit 1009 in Petition for Inter Partes Review of U.S. Pat. No. 10,583,962, filed Jan. 5, 2021, 24 Pages.
Exhibit 1010 in Petition for Inter Partes Review of U.S. Pat. No. 10,583,962, filed Jan. 5, 2021, 19 Pages.
Exhibit 1011 in Petition for Inter Partes Review of U.S. Pat. No. 10,583,962, filed Jan. 5, 2021, 26 Pages.
Exhibit 1012 in Petition for Inter Partes Review of U.S. Pat. No. 10,583,962, filed Jan. 5, 2021, 3 Pages.
Exhibit 1013 in Petition for Inter Partes Review of U.S. Pat. No. 10,583,962, filed Jan. 5, 2021, 168 Pages.
Exhibit 1014 in Petition for Inter Partes Review of U.S. Pat. No. 10,583,962, filed Jan. 5, 2021, 481 Pages.
Exhibit 1015 in Petition for Inter Partes Review of U.S. Pat. No. 10,583,962, filed Jan. 5, 2021, 6 Pages.
Exhibit 1016 in Petition for Inter Partes Review of U.S. Pat. No. 10,583,962, filed Jan. 5, 2021, 242 Pages.
Exhibit 1017 in Petition for Inter Partes Review of U.S. Pat. No. 10,583,962, filed Jan. 5, 2021, 6 Pages.
Exhibit 1018 in Petition for Inter Partes Review of U.S. Pat. No. 10,583,962, filed Jan. 5, 2021, 250 Pages.
Exhibit 1019 in Petition for Inter Partes Review of U.S. Pat. No. 10,583,962, filed Jan. 5, 2021, 44 Pages.
Exhibit 1020 in Petition for Inter Partes Review of U.S. Pat. No. 10,583,962, filed Jan. 5, 2021, 5 Pages.
Exhibit 1021 in Petition for Inter Partes Review of U.S. Pat. No. 10,583,962, filed Jan. 5, 2021, 1 Pages.
Exhibit 1022 in Petition for Inter Partes Review of U.S. Pat. No. 10,583,962, filed Jan. 5, 2021, 1 Pages.
Exhibit 1023 in Petition for Inter Partes Review of U.S. Pat. No. 10,583,962, filed Jan. 5, 2021, 24 Pages.
Exhibit 1024 in Petition for Inter Partes Review of U.S. Pat. No. 10,583,962, filed Jan. 5, 2021, 28 Pages.
International Search Report and Written Opinion for International Application No. PCT/US2019/014940, dated Jul. 26, 2019.
International Search Report for International Application No. PCT/IL2019/050689, dated Aug. 23, 2019.
International Search Report for International Application No. PCT/IL2020/050433, dated Jun. 21, 2020.
Non-Final Rejection issued Apr. 12, 2018, in U.S. Appl. No. 15/826,201.
Non-Final Rejection issued Jan. 24, 2019, in U.S. Appl. No. 16/216,724.
Extended European search report for application No. 18892505.1 dated Sep. 17, 2021.
Toolguyd, Sys-Cart Base, a Systainer Mounting Platform, Jul. 28, 2014, 9 pages, available online: https://toolguyd.com/systainer-sys-cart-mounting-base/.
Final Rejection issued Nov. 28, 2018, in U.S. Appl. No. 15/826,232, 14 pages.

\* cited by examiner

TROLLEY AND MECHANICAL BRAKING SYSTEM THEREFOR

TECHNOLOGICAL FIELD

The present disclosure relates to mechanical braking systems for wheeled trolleys, trolleys comprising a mechanical braking system and methods for controlling movement thereof.

BACKGROUND

Trolleys, wheeled platforms and the like are conventionally used for easy transport of bulky and heavy objects. It is desirable to provide improved means of control of movement the trolley, in particular when maneuvering objects onto and off of the trolley.

GENERAL DESCRIPTION

According to a first aspect of this disclosure, there is provided a wheeled trolley comprising: a platform base member; a wheel set defining a ground contact surface; and a foot lever articulated to the platform base member through a biasing mechanism. The foot lever is configured to have a first position in which it is not in contact with the ground contact surface, and a second position in which the lever is in contact with the ground contact surface, against a biasing effect of the biasing mechanism, and the foot lever is biased into said first position by the biasing mechanism.

According to another aspect, there is provided a mechanical braking system for a wheeled trolley as defined above.

Further provided is a method for controlling movement of a trolley as disclosed herein, comprising applying force to the foot lever to urge the lever against the biasing effect from the first position into the second position.

Any one or more of the following features, designs and configurations can be incorporated in any of the aspects of this disclosure, solely or in any combination thereof:

The biasing mechanism can comprise a pivoting structure and a biasing member.

The pivoting structure can be arranged to pivot about an axis of rotation, and wherein the foot lever and the biasing member are arranged on the pivoting structure on opposite sides across the axis of rotation from one another.

The pivoting structure can be pivotably articulated to the platform about an axis of rotation and wherein the biasing member is disposed at one side of the axis of rotation and below the platform, and the foot lever is disposed at an opposite side of the axis of rotation adjacent an edge of the platform.

The biasing member can bias the foot lever into the first position, and wherein, in use, a force applied to the foot lever against the biasing effect of the biasing member urges the foot lever into the second position. Further, when in use, upon removal of the applied force, the biasing member can bias the foot lever to return to the first position.

The biasing member can be an elastically deformable member disposed between a bottom face of the platform and a support member articulated to the pivoting structure, e.g. the biasing member can be a compression spring.

The pivoting structure can have a first arm extending substantially parallel to the axis of rotation, and two parallelly extending second arms extending from the first arm, where the support member is articulated to said first arm and wherein the foot lever extends between respective end portions of the second arms.

In the first position, an end portion of each of the second arms bears against a bottom face of the platform adjacent an edge of the platform, optionally wherein bearing of an end portion of at least one of the second arms is against the bottom face of the platform is cushioned.

The foot lever can be pivotably articulated at the ends of the second arms about an axis parallel to the axis of rotation.

The pivoting structure can be articulated to the platform by a pair of articulation members, each fixed to a respective second arm, said articulation members being configured with an articulation axel, the articulation axels co-extends with the axis of rotation. Particularly, each of the articulation axels is integral with the articulation member, or each of the articulation axels is removably received within the articulation member.

The biasing member can be a tension spring articulated to the second arms, and disposed between the axis of rotation and the platform edge.

The foot lever can be pivotably articulated to the pivoting structure.

The foot lever, when in its first position, can have an operable position disposed closest to the ground contact surface, and a collapsed position, in which the foot lever is stowed in proximity to the platform.

The trolley can further comprise an arresting mechanism for arresting the foot lever at the stowed position.

The foot lever can have a foot-engaging surface at a top face thereof and a ground-engaging surface and a bottom face thereof, and wherein the ground-engaging surface comprises one or more ground contact elements.

The foot lever can have a foot-engaging surface, that extends below a bottom face of an edge of the platform, at a distance facilitating inserting at least a front portion of a user's foot.

The foot lever can be pivotally articulable between a position in which an end of the foot lever is at a first distance away from the ground contact surface and a position in which the end of the foot lever is at a second distance away from the ground contact surface, wherein the second distance is greater than the first distance.

The pivoting structure can be integrally configured with the foot lever.

The mechanical braking system can be detachably attachable at a bottom face of the trolley.

The trolley can have a top surface of the platform that is configured with utility module articulation arrangement, for detachably-attaching thereto of at least one utility module.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

Figure 1A:
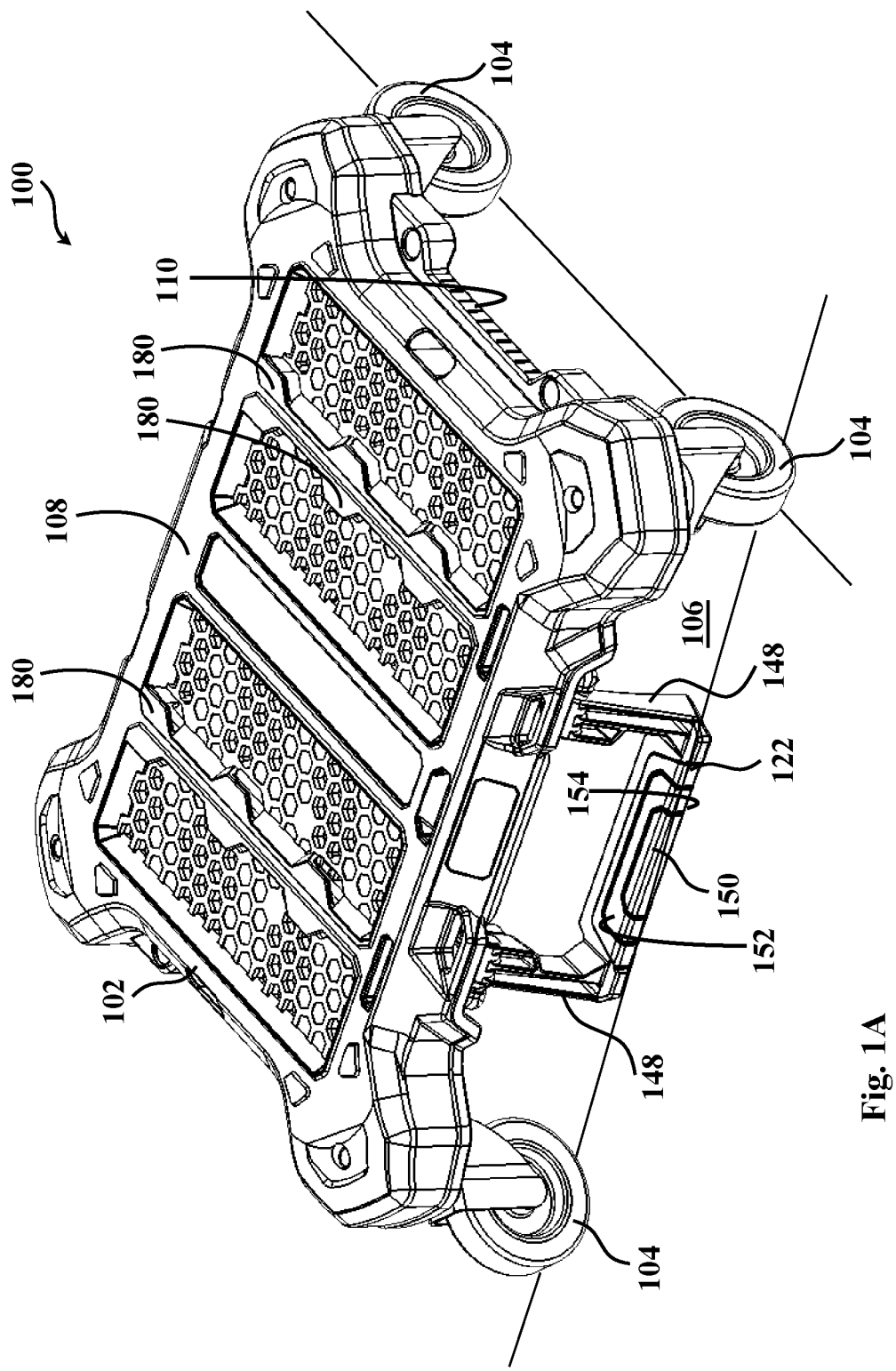
FIGS. 1A-1C show, respectively.
Figure 1B:
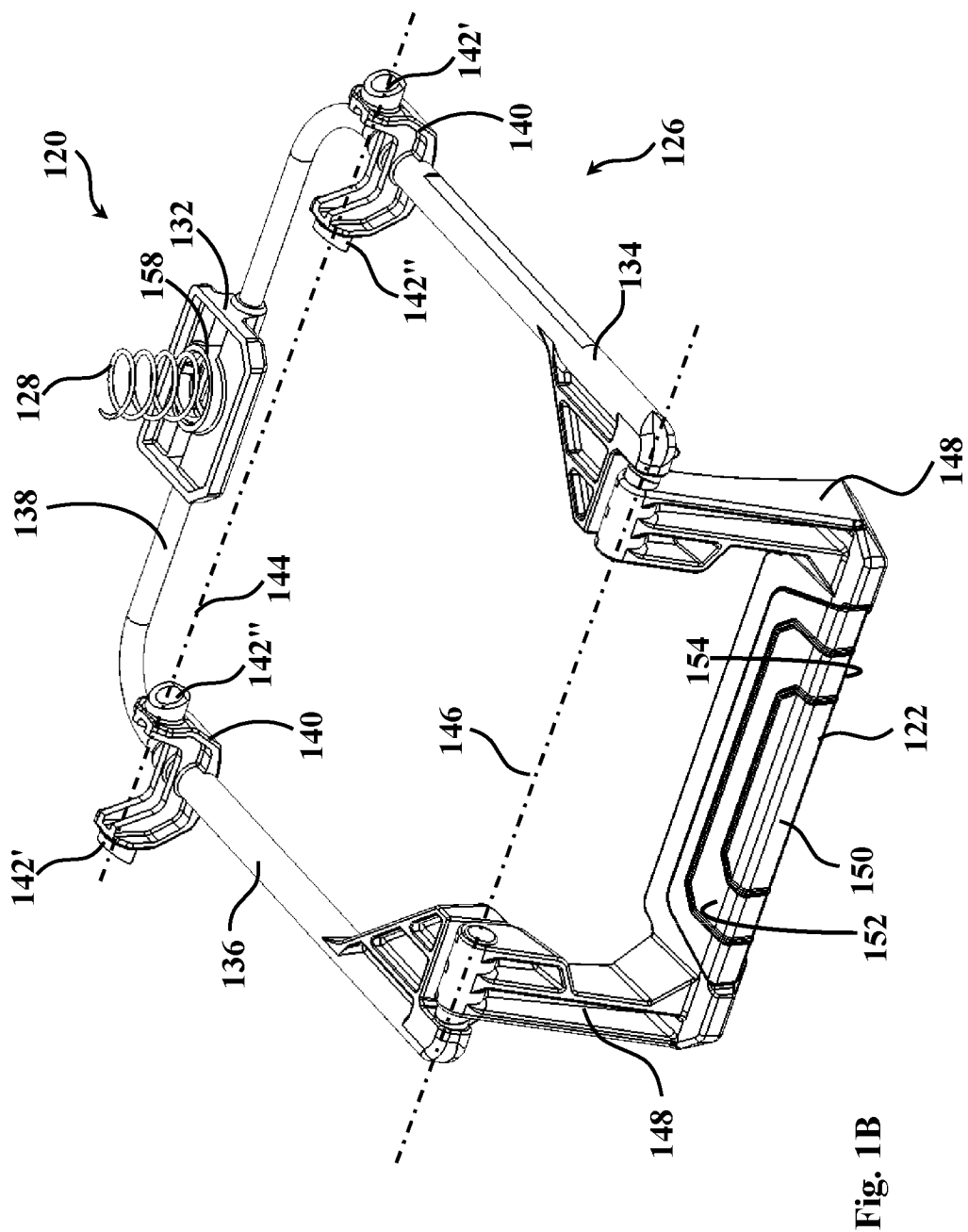
Figure 1C:
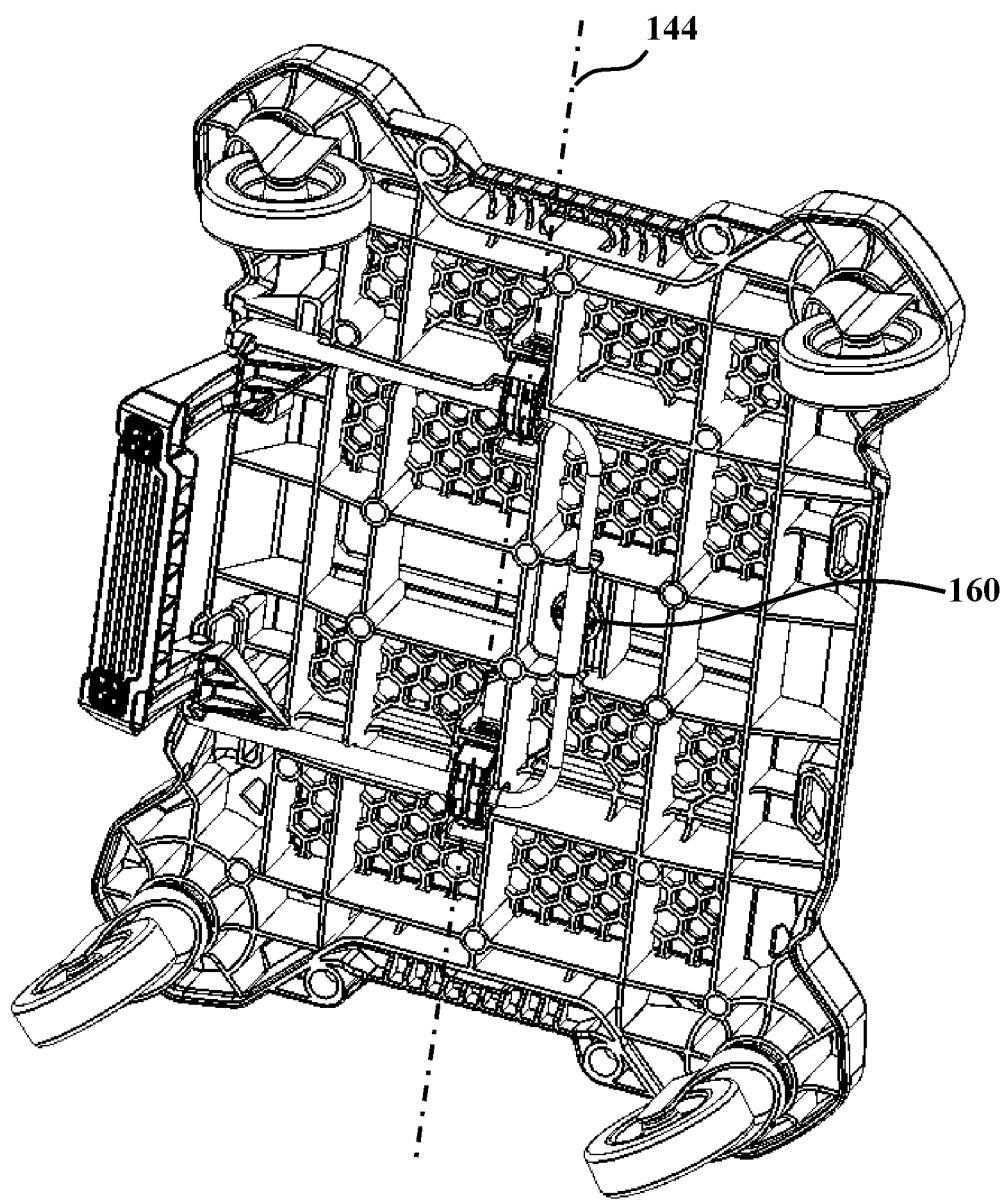

a top perspective view of a trolley and a mechanical braking system according to one embodiment of this disclosure (FIG. 1A), a top perspective view of the mechanical braking mechanism of FIG. 1A without the trolley (FIG. 1B), and a bottom perspective view of the trolley and mechanical braking system (FIG. 1C).

Figure 2A:
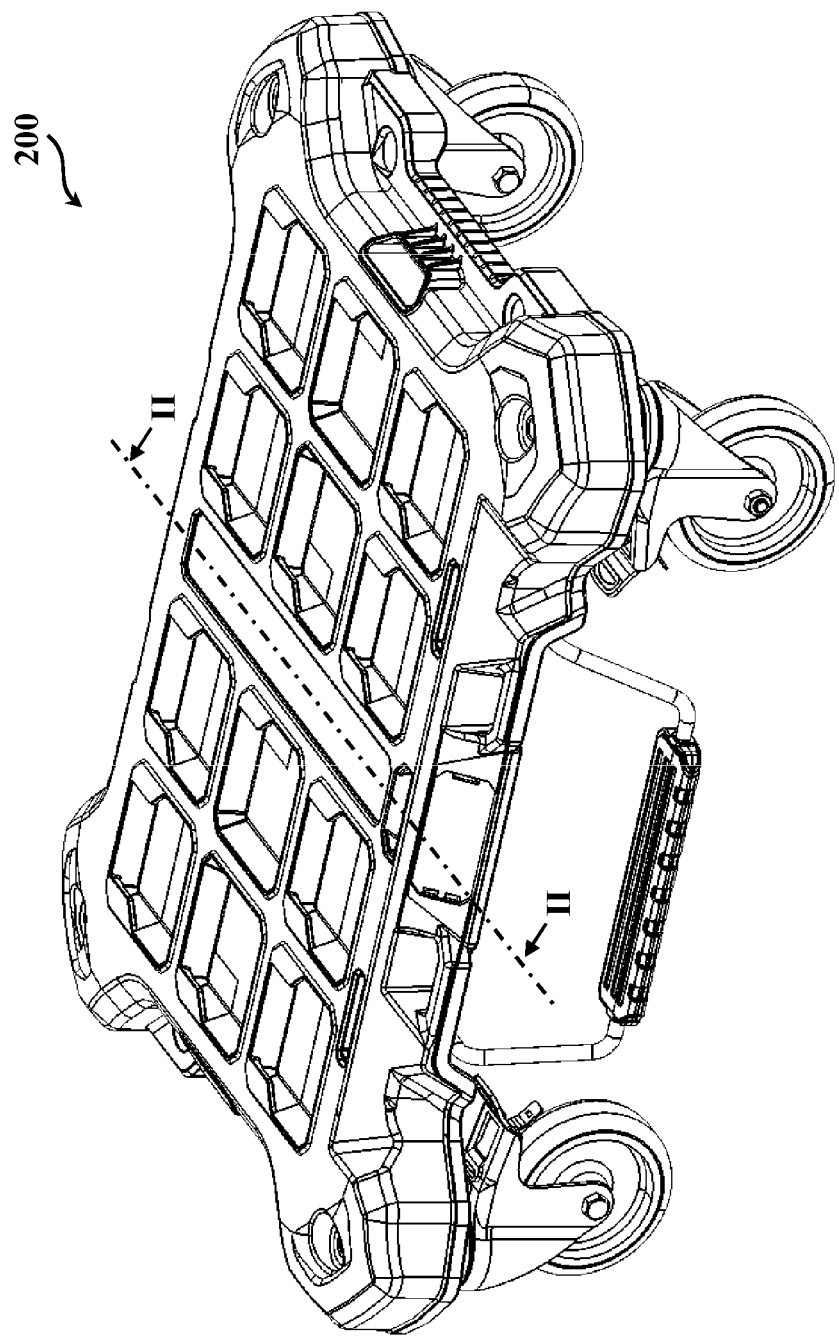
Figure 2B:
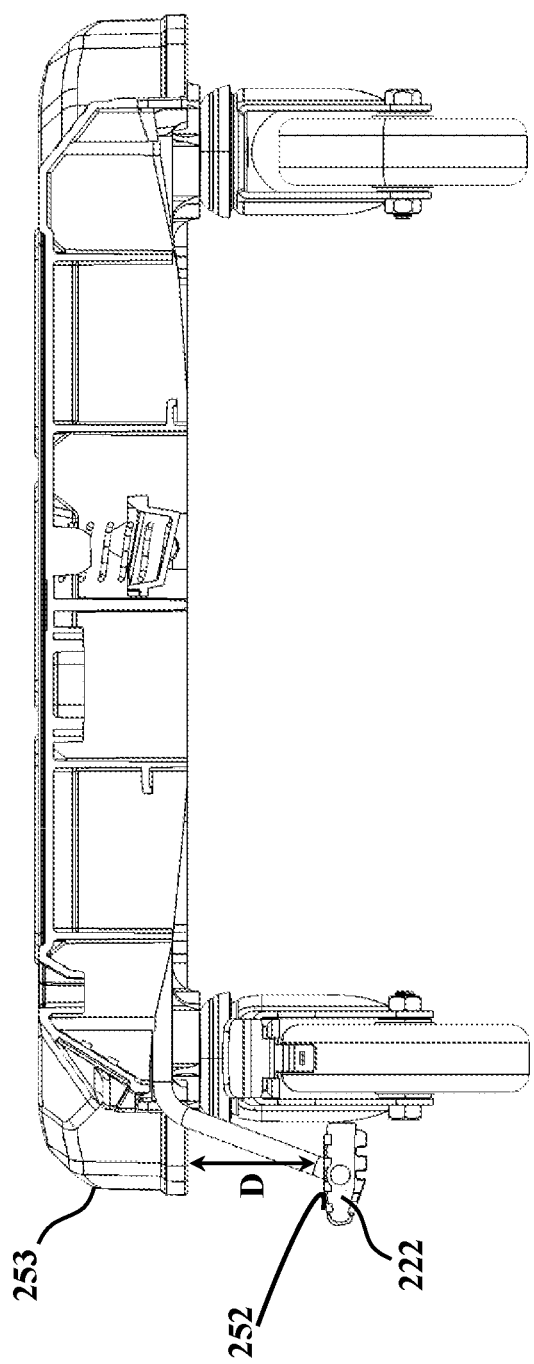
Figure 2C:
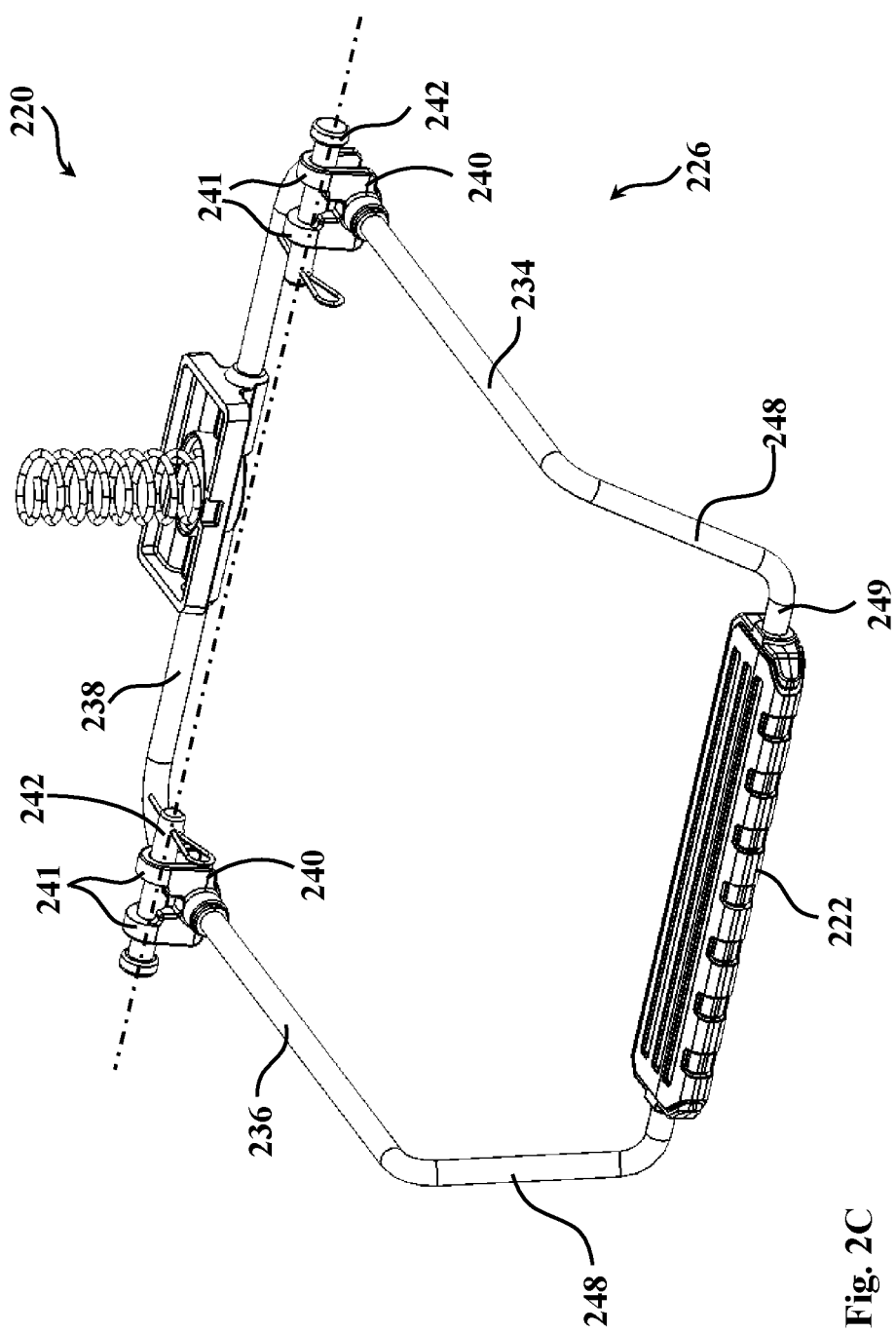

FIGS. 2A-2C show, respectively:

a top perspective view of a trolley and a mechanical braking system according to another embodiment of this disclosure (FIG. 2A), a planar side-view cross-section along line II-II of FIG. 2A (FIG. 2B), and a perspective top view of the particular example of the mechanical braking system (FIG. 2C).

Figure 3A:
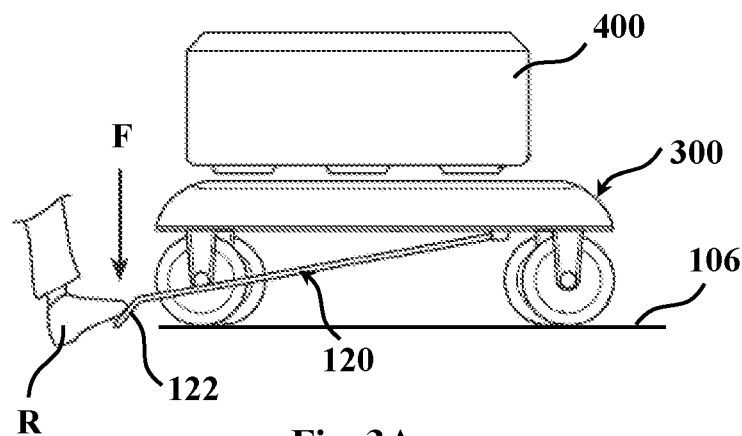

FIG. 3A is a schematic side-view illustrating foot-operation of the mechanical braking system.

Figure 3B:
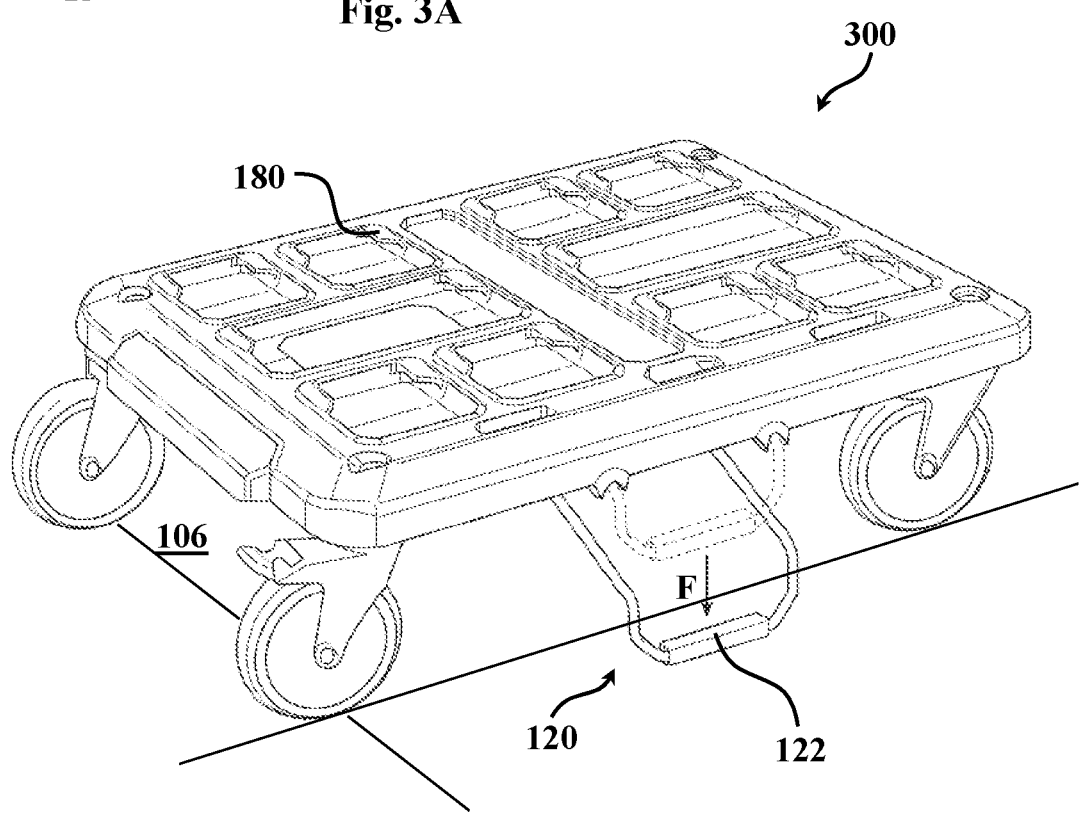

FIG. 3B is a perspective view illustrating respective first and second positions of the mechanical braking system.

DETAILED DESCRIPTION OF EMBODIMENTS

An embodiment of a trolley, also known as a dolly cart or hand truck, generally designated 100 is shown in FIGS. 1A-1C. Trolley 100 comprises a platform base member 102 attached to a wheel set comprising four castor wheels 104. The wheel set defines a ground contact surface 106 (shown in FIG. 1A), which is a surface contacted by the wheel set. Platform base member 102 comprises a top face 108 and a bottom surface 110. In this context, "top surface" and "bottom surface" refer to surfaces respectively further from and closer to the ground contact surface. Similarly, "up" and "down" refer to direction away from and towards the ground contact surface respectively.

The top face 108 of the platform base member 102 is generally used for placing of heavy or bulky items, for transport thereof (as shown schematically in FIG. 3A).

The trolley 100 further comprises a mechanical braking system 120 disposed at the bottom surface 110 of the platform base member 102. With reference to FIG. 1B, there is shown the mechanical braking system 120 without the platform base member 102 or castor wheels 104. The mechanical braking system 120 comprises a foot lever 122 attached to a biasing mechanism 124. Biasing mechanism 124 comprises a pivoting structure 126, and a biasing member 128 in the form of, in this example, a compression spring. In the exemplified embodiment, the biasing member 128 is disposed between spring receptacle 130 at the bottom surface 110 of the platform base member 102 (FIG. 1C) and a support member 132 articulated to the pivoting structure 126. The pivoting structure 120 comprises two second arms 134 and 136, parallelly extending one to the other, and extending from first arm 138 at a substantially right-angle. The support member 132 is articulated to the first arm 138.

The pivoting structure 126 is articulated to the platform 102 by a pair of articulation members 140, each fixed to a respective second arm 134,136, the articulation members being configured with an articulation axel 142. In the present example, each of axels 142 is split into left and right coextending portions 142' and 142". The axels 142 define between them an axis of rotation 144. Each of the axels 142 is configured, for snap engagement, however pivotably, within axel receptacle 143 configured at the bottom surface of the platform 102.

The first arm 138 extends substantially parallel to the axis of rotation 144, and two parallelly extending second arms 134,136 extend from the first arm; such that the support member 132 is articulated to the first arm.

The compression spring 128 is received, at a first end thereof, within receptacle 158 of the support member 132 and an opposite, top end within receptacle 160 at the bottom face of the platform 102, so as to pivotally bias the braking mechanism 120 into a first position, in which the foot lever is not in contact with the ground contact surface.

In other embodiments (not shown), a contraction biasing member can be disposed intermediate the axis of rotation 144 and the end portions of the second arms 134,136. It is noted that instead of a compression spring, other biasing members are also encompassed by the present disclosure, e.g. a piston mechanism, resilient member, etc.

The foot lever 122 extends between respective end portions of the second arms 134,136, and in this particular example is pivotably secured about a pivot axis 146, which is parallel to the axis of rotation 144.

The foot lever 122 comprises two parallel arms 148 and a foot-engaging member 150, which has a foot-engaging surface 152 and a ground-engaging surface 154. The ground engaging surface 154 can be fitted with at least one ground contact element 156 (as seen in FIG. 1C).

The top face 108 of platform 102 is configured with utility module articulation arrangement, generally designated 180, for detachably-attaching thereto of at least one utility module, as described for example, in Applicants' PCT patent publication WO2017/191628, incorporated herein by reference for its relevant parts.

At its normal state, the braking mechanism is disposed in the first position, so that the foot lever is remote from the ground contact surface and does not hinder the rolling or moving of the trolley along the surface. When it is required to load/unload/articulate/detach a utility module 400 from the top face 108 of the trolley 300 (as seen, for example in FIG. 3A), it is advantageous to temporarily prevent the trolley from displacing over the ground surface 106, whereupon applying a force F by a user's foot R to the foot lever 122 against the biasing effect of the biasing member 128 urges the foot lever into a second position, in which it is in contact with the ground contact surface. This can also be seen in FIG. 3B, in which the lever is shown in a dashed line in the first position, and in solid line in the ground-engaging second position.

Another example of a trolley 200 and its associated mechanical braking mechanism 220 is shown in FIGS. 2A-2C. It is noted that in FIGS. 2A-3C, elements having same functionality as those of FIGS. 1A-1C will be given similar reference numbers, shifted by 100.

In the exemplary trolley of FIGS. 2A-2C, pivoting structure 226 is a continuous frame-like member that is constituted by the first arm 238 and its two integrally-formed second arms 234,236, and continuously extending to lever arms 248, and further to a horizontal portion 249 onto which the lever 222 is articulated.

In this specific example, articulation members 240 are each configured with an axel bushing 241, each receiving an axel 242 in a removable manner. The axel 242 is configured for pivotal articulation within axel receptacle (not seen) at the bottom face of the platform.

Shown in FIG. 2B is a side-view cross section of trolley 200. As can be seen, the foot-engaging surface 252 of the foot lever 222 extends below a bottom face of an edge of the platform 253, at a distance D facilitating inserting at least a front portion of a user's foot (as exemplified in FIG. 3A). Although this is shown specifically for the embodiment of FIGS. 2A-2C, it is to be understood that the same principle of operation also applies to the example shown in FIGS. 1A-1C.

Those skilled in the art to which this invention pertains will readily appreciate that numerous changes, variations, and modifications can be made without departing from the scope of the presently disclosed subject matter, mutatis mutandis.

The invention claimed is:

1. A wheeled trolley comprising:
 a platform base member;
 a wheel set defining a ground contact surface; and
 a foot lever articulated to the platform base member through a biasing mechanism, said foot lever being configured to have a first position in which it is not in contact with the ground contact surface, and a second position in which the lever is in contact with the ground contact surface, against a biasing effect of the biasing mechanism,
 wherein the foot lever is biased into said first position by the biasing mechanism, and
 wherein the biasing mechanism comprises a pivoting structure and a biasing member, the biasing member is an elastically deformable member disposed between a bottom face of the platform and a support member articulated to the pivoting structure.

2. The trolley of claim 1, wherein the pivoting structure is arranged to pivot about an axis of rotation, and wherein the foot lever and the biasing member are arranged on the pivoting structure on opposite sides across the axis of rotation from one another.

3. The trolley of claim 1, wherein the pivoting structure is pivotably articulated to the platform about an axis of rotation and wherein the biasing member is disposed at one side of the axis of rotation and below the platform, and the foot lever is disposed at an opposite side of the axis of rotation adjacent an edge of the platform.

4. The trolley of claim 1, wherein the biasing member biases the foot lever into the first position, and wherein, in use, a force applied to the foot lever against the biasing effect of the biasing member urges the foot lever into the second position.

5. The trolley of claim 4, wherein, in use, upon removal of the applied force, the biasing member biases the foot lever to return to the first position.

6. The trolley of claim 1, wherein the biasing member is a compression spring.

7. The trolley of claim 1, wherein the pivoting structure has a first arm extending substantially parallel to the axis of rotation, and two parallelly extending second arms extending from the first arm, where the support member is articulated to said first arm and wherein the foot lever extends between respective end portions of the second arms.

8. The trolley of claim 7, wherein in the first position, an end portion of each of the second arms bears against a bottom face of the platform adjacent an edge of the platform.

9. The trolley of claim 7, wherein the foot lever is pivotably articulated at the ends of the second arms about an axis parallel to the axis of rotation.

10. The trolley of claim 7, wherein the pivoting structure is articulated to the platform by a pair of articulation members, each fixed to a respective second arm, said articulation members being configured with an articulation axel, the articulation axels co-extends with the axis of rotation.

11. The trolley of claim 10, wherein (i) each of the articulation axels is integral with the articulation member, or (ii) each of the articulation axels is removably received within the articulation member.

12. The trolley of claim 7, wherein the biasing member is a tension spring articulated to the second arms, and disposed between the axis of rotation and the platform edge.

13. The trolley of claim 1, wherein the foot lever is pivotably articulated to the pivoting structure.

14. The trolley of claim 13, wherein the foot lever, when in its first position, has an operable position disposed closest to the ground contact surface, and a collapsed position, in which the foot lever is stowed in proximity to the platform.

15. The trolley of claim 1, wherein (i) the foot lever has a foot-engaging surface at a top face thereof and a ground-engaging surface and a bottom face thereof, and wherein the ground-engaging surface comprises one or more ground contact elements, (ii) a foot-engaging surface of the foot lever extends below a bottom face of an edge of the platform, at a distance facilitating inserting at least a front portion of a user's foot, and/or (iii) the foot lever is pivotally articulable between a position in which an end of the foot lever is at a first distance away from the ground contact surface and a position in which the end of the foot lever is at a second distance away from the ground contact surface, wherein the second distance is greater than the first distance.

16. The trolley of claim 1, wherein the pivoting structure is integrally configured with the foot lever.

17. The trolley of claim 1, wherein a top surface of the platform is configured for detachably-attaching thereto of at least one utility module.

18. A mechanical braking system for a wheeled trolley having a platform base member and a wheel set defining a ground contact surface, the mechanical braking system comprising:
 a foot lever articulable to the platform base member through a biasing mechanism, said foot lever being configured to have a first position in which it is not in contact with the ground contact surface, and a second position in which the lever is in contact with the ground contact surface, against a biasing effect of the biasing mechanism,
 wherein the foot lever is biased into said first position by the biasing mechanism, and
 wherein the biasing mechanism comprises a pivoting structure and a biasing member, the biasing member is an elastically deformable member being configured to be disposed between a bottom face of the platform and a support member articulated to the pivoting structure.

* * * * *